(12) United States Patent
Sun et al.

(10) Patent No.: US 12,213,401 B1
(45) Date of Patent: Feb. 4, 2025

(54) DEVICE FOR MONITORING SEEDING AND METHOD THEREOF

(71) Applicant: SHANDONG ACADEMY OF AGRICULTURAL MACHINERY SCIENCES, Shandong (CN)

(72) Inventors: Yongjia Sun, Jinan (CN); Jingxin Shen, Jinan (CN); Yifei Wei, Jinan (CN); Qingqing Dou, Jinan (CN); Rui Li, Jinan (CN); Yuxu Wang, Jinan (CN); Yitian Sun, Jinan (CN)

(73) Assignee: SHANDONG ACADEMY OF AGRICULTURAL MACHINERY SCIENCES, Shandong (CN)

( * ) Notice: Subject to any disclaimer, the term of this patent is extended or adjusted under 35 U.S.C. 154(b) by 0 days.

(21) Appl. No.: 18/729,112

(22) PCT Filed: Mar. 7, 2024

(86) PCT No.: PCT/CN2024/080490
§ 371 (c)(1),
(2) Date: Jul. 15, 2024

(30) Foreign Application Priority Data

Aug. 10, 2023 (CN) .......................... 202311007460.2

(51) Int. Cl.
*A01C 7/10* (2006.01)
(52) U.S. Cl.
CPC .................................... *A01C 7/105* (2013.01)
(58) Field of Classification Search
CPC ........... A01C 7/105; A01C 7/102; A01C 7/10; A01C 7/08; A01C 7/00
See application file for complete search history.

(56) References Cited

U.S. PATENT DOCUMENTS

| | | |
|---|---|---|
| 2010/0192821 A1 | 8/2010 | Garner et al. |
| 2015/0094916 A1 | 4/2015 | Bauerer et al. |
| 2021/0243942 A1 | 8/2021 | Mears et al. |

FOREIGN PATENT DOCUMENTS

| | | |
|---|---|---|
| CN | 101361423 A | 2/2009 |
| CN | 103808366 A | 5/2014 |

(Continued)

OTHER PUBLICATIONS

Tang, Yun-meng, "Design of Seeding Monitoring System for Corn Precision seeder," Dissertation submitted to Shihezi University, Jun. 2019.

(Continued)

*Primary Examiner* — Christopher J. Novosad
(74) *Attorney, Agent, or Firm* — Oliff PLC

(57) ABSTRACT

A device for monitoring seeding and a method thereof, including a monitoring sensor and an algorithm control module, wherein the monitoring sensor includes a first sensor-channel emitting end, a first sensor-channel receiving end, a second sensor-channel emitting end and a second sensor-channel receiving end, and are arranged, in a two-channel opposite-emission photoelectric induction mode, on two sides of a seed belt, respectively; and the algorithm control module is configured to perform counting of seeding, reseeding and missed seeding, monitoring of seed deficiency and seed blockage according to a duration time of a first low level and an interval time of two adjacent falling edges of signals of the two sensor-channels; further, to perform monitoring of a rotating speed of a motor according to an interval time of two adjacent falling edges of signals of the second sensor-channel.

7 Claims, 8 Drawing Sheets

(56) References Cited

FOREIGN PATENT DOCUMENTS

| | | | |
|---|---|---|---|
| CN | 106134579 | A | 11/2016 |
| CN | 109688794 | A | 4/2019 |
| CN | 209731985 | U | 12/2019 |
| CN | 110809954 | A | 2/2020 |
| CN | 114246033 | A | 3/2022 |
| CN | 114868493 | A | 8/2022 |
| CN | 117084026 | A | 11/2023 |
| EP | 3967121 | A1 | 3/2022 |

OTHER PUBLICATIONS

Dec. 15, 2023 Office Action issued in Chinese Patent Application No. 202311007460.2.
Apr. 29, 2024 International Search Report issued in International Patent Application No. PCT/CN2024/080490.
Apr. 29, 2024 Written Opinion of the International Searching Authority issued in International Patent Application No. PCT/CN2024/080490.

DEVICE FOR MONITORING SEEDING AND METHOD THEREOF

TECHNICAL FIELD

The present invention relates to the technical field of agricultural equipment, in particular to a device for monitoring seeding and a method thereof.

BACKGROUND

The statements in this section merely provide background information related to the present invention and are not necessarily prior art.

Seeding process is an important link in crop production process. The quality of the seeding directly affects the emergence rate and yield of crops. Precision seeding refers to the process of using seeding machinery to sow seeds accurately into soil according to certain plant spacing and uniform row spacing to ensure the equal number of seeds in each hole.

The traditional seeder mainly works by the seed metering device driven by the ground wheel. A finger-clamp type seed-metering device is used as the seed metering device, and a maximum speed thereof can reach 8 km/h. In order to realize precision seeding, a monitoring sensor is mounted outside a seed tube to realize the seed counting function. However, when the speed of seeder continues to increase, the ground wheel is easy to slip, which seriously affects the quality of seeding. The precision seeding with the speed of 12 km/h and above can be realized by using the motor driving seed metering device instead of the ground wheel driving. At present, the speed of seeder has reached 16 km/h, but the way of seed dropping through the seed tube will cause the phenomenon of seed bouncing in the process of seed falling inside the seed tube and landing, the position of seed dropping will be affected, and the qualified rate and consistency of seed spacing cannot be guaranteed. Therefore, the seed dropping device replaces the traditional seed tube to ensure that the seed falls stably during the falling process, and the existing seeding monitoring sensor for the seed tube is no longer applicable. At the same time, due to the addition of the seed dropping device, it is necessary to identify the seed blockage and seed deficiency in addition to the monitoring of seeding count.

Because the seed dropping device needs motor drive, it needs to measure the motor speed and feedback on the actual motor speed in real time. The motor needs to be equipped with a speed feedback device, which leads to complex motor structure design, cumbersome mounting and increased design cost.

SUMMARY

In order to solve the defects of the prior art, the present invention provides a device for monitoring seeding and a method thereof, which can realize the counting of normal seeding, missed seeding and reseeding during high-speed seeding, identifying of seed blockage and seed deficiency, and monitoring of motor rotation speed, under the condition of the addition of the seed dropping device.

In order to achieve the above objects, the present invention adopts the following technical solutions:

A first aspect of the present invention provides a device for monitoring seeding.

The device for monitoring seeding, comprising a monitoring sensor and an algorithm control module which are mutually connected; wherein,
  the monitoring sensor comprises a first sensor-channel emitting end, a first sensor-channel receiving end, a second sensor-channel emitting end and a second sensor-channel receiving end, and are arranged, in a two-channel opposite-emission photoelectric induction mode, on two sides of a seed belt, respectively; wherein, the first sensor-channel emitting end and the first sensor-channel receiving end form a first sensor-channel, and the second sensor-channel emitting end and the second sensor-channel receiving end form a second sensor-channel; and
  the algorithm control module is configured to perform counting of seeding, reseeding and missed seeding, monitoring of seed deficiency and seed blockage according to a duration time of a first low level and an interval time of two adjacent falling edges of signals of the two sensor-channels; further, to perform monitoring of a rotating speed of a motor according to an interval time of two adjacent falling edges of signals of the second sensor-channel.

Further, an upper pulley and a lower pulley are respectively arranged at two ends of the seed belt;
  wherein, the first sensor-channel emitting end and the second sensor-channel emitting end are symmetrical with respect to a connecting line of a center point of the upper pulley and a center point of the lower pulley.

Further, the first sensor-channel emitting end and the first sensor-channel receiving end are symmetrical with respect to the plane in which the seed belt is located, and the second sensor-channel emitting end and the second sensor-channel receiving end are symmetrical with respect to the plane in which the seed belt is located.

Further, infrared light emitting diodes are mounted inside the first sensor-channel emitting end and the second sensor-channel emitting end, and a plurality of photosensitive elements are mounted inside the first sensor-channel receiving end and the second sensor-channel receiving end.

Further, by adjusting emission angles of the infrared light emitting diodes, a distance between the first sensor-channel emitting end and the first sensor-channel receiving end, and a distance between the second sensor-channel emitting end and the second sensor-channel receiving end, all the photosensitive elements can cover an illumination range of light beams emitted by the infrared light emitting diodes.

Further, when belt teeth on the seed belt pass through the monitoring sensor, the light beams of the first sensor-channel and the second sensor-channel are blocked simultaneously.

A second aspect of the present invention provides a method for monitoring the seeding, comprising the steps of:
  acquiring a duration time of a first low level and an interval time between two adjacent falling edges of a signal of a first sensor-channel and a duration time of a first low level and an interval time between two adjacent falling edges of a signal of a second sensor-channel;
  executing counting of seeding, reseeding and missed seeding, monitoring of seed deficiency and seed blockage, according to the duration time of the first low level and the interval time between two adjacent falling edges of the signals of the two sensor-channels; and
  monitoring a rotation speed of a motor according to the interval time between two adjacent falling edges of the signal of the second sensor-channel;

wherein, the first sensor-channel consists of the first sensor-channel emitting end and the first sensor-channel receiving end, and the second sensor-channel consists of the second sensor-channel emitting end and the second sensor-channel receiving end; and, the first sensor-channel emitting end, the first sensor-channel receiving end, the second sensor-channel emitting end and the second sensor-channel receiving end are arranged at two sides of the seed belt in a two-channel opposite-emission photoelectric induction mode.

Further, if the duration time of the first low level of the signal of the first sensor-channel is equal to the duration time of the first low level of the signal of the second sensor-channel, and the interval time between the two adjacent falling edges of the signal of the first sensor-channel is less than the interval time between the two adjacent falling edges of the signal of the second sensor-channel, or if the duration time of the first low level of the signal of the first sensor-channel is greater than the duration time of the first low level of the signal of the second sensor-channel, which means that there are seeds passing through, then recording a number of cycles when the seeds passing through, and recording a number of times the falling edges occur in the signal of the first sensor-channel within the interval time between the two adjacent falling edges of the signal of the second sensor-channel; if the number of the times the falling edges occur is within a set number, executing a counting of sowing seeds (seeding); if the number of the times the falling edges occur exceeds the set number, executing the counting of the reseeding; if the number of the cycles when the seeds passing through is not a theoretical value, executing the counting of the missed seeding; if a number of the counting of the missed seeding exceeds a threshold value, which represents that the seed deficiency occurs.

Further, if the duration time of the first low level of the signal of the first sensor-channel is greater than the interval time between the two adjacent falling edges of the signal of the second sensor-channel, then it represents that a seed blockage occurs.

Further, the rotation speed of the motor is:

$$N_{motor} = 3Hm/2\pi r \sum_{i=1}^{3} \Delta t_{2i}$$

wherein, r is the pulley radius, H is the distance between two adjacent belt teeth, m is the reduction ratio, and $\Delta t_{2i}$ is the interval time between two adjacent falling edges of the $i^{th}$ signal of the second sensor-channel.

Compared with the prior art, the present invention has the advantages that:

According to the present invention, proposing the device for monitoring seeding, realizing the counting of normal seeding, missed seeding and reseeding during high-speed seeding, identifying of seed blockage and seed deficiency, and monitoring of motor rotation speed, and improving the monitoring accuracy, simplifying the design structure of the motor by omitting the motor rotation speed feedback device, which has a higher application range.

BRIEF DESCRIPTION OF THE DRAWINGS

The accompanying drawings constituting a part of the present invention are used to provide a further understanding of the present invention. The exemplary examples of the present invention and descriptions thereof are used to explain the present invention, and do not constitute an improper limitation of the present invention.

Figure 1:
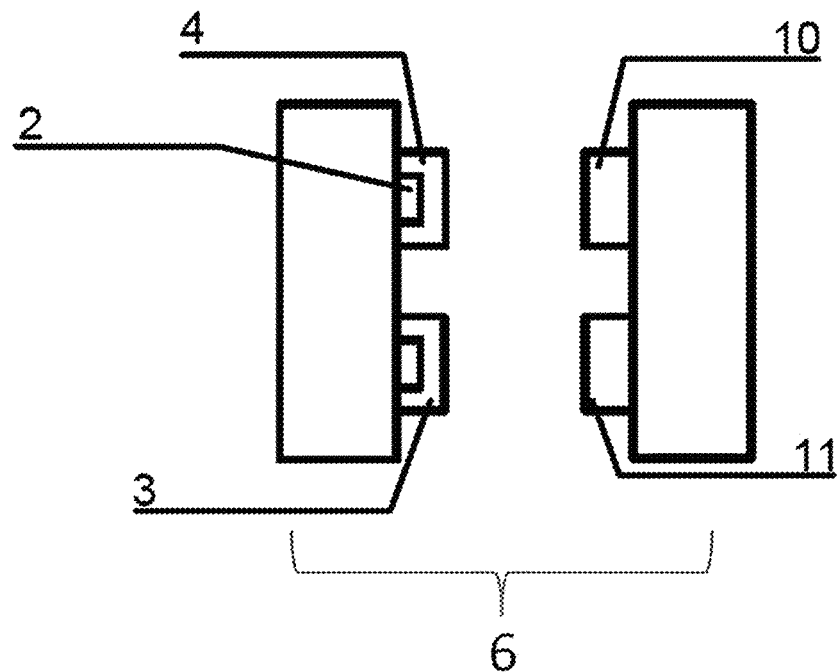
FIG. 1 is a top view of a monitoring sensor according to Embodiment 1 of the present invention.
Figure 2:
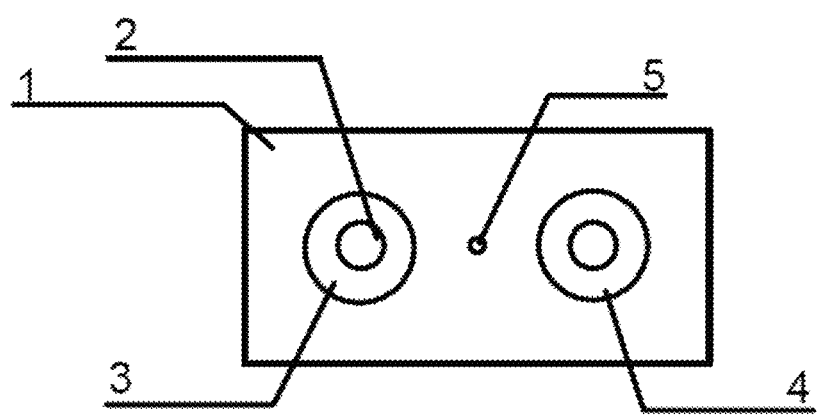
FIG. 2 is a side view of an emitting module of the monitoring sensor according to Embodiment 1 of the present invention.
Figure 3:
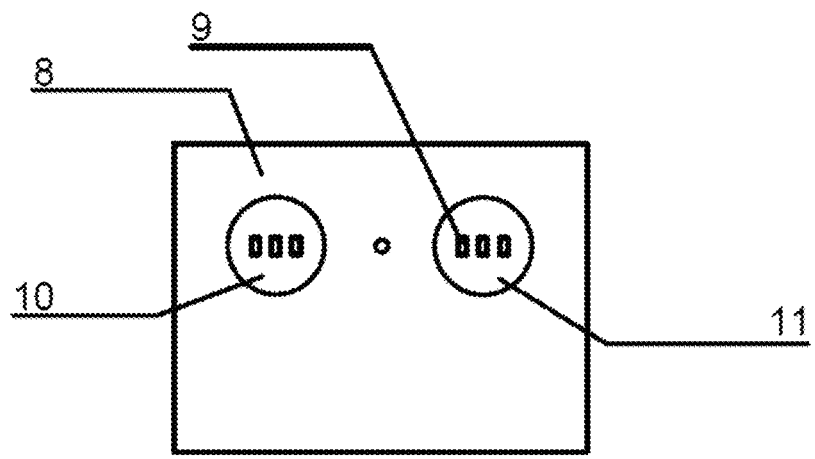
FIG. 3 is a side view of a receiving module of the monitoring sensor according to Embodiment 1 of the present invention.

Wherein: 1—sensor emitting module housing; 2—infrared light emitting diode; 3—first sensor-channel emitting end; 4—second sensor-channel emitting end; 5—screw fixing hole; 6—monitoring sensor; 7—sensor signal acquisition unit; 8—sensor receiving module housing; 9—patch-type photosensitive element; 10—second sensor-channel receiving end; 11—first sensor-channel receiving end; 12—seed belt; 13—belt teeth; 14—first sensor-channel mounting groove; 15—second sensor-channel mounting groove; 16—seed metering tray; 17—seed metering tray opening; 18—upper pulley; 19—lower pulley; 100—power supply module; 200—data storage unit; 300—algorithm control module; 400—CAN communication module.

DETAILED DESCRIPTION

With reference to the accompanying drawings, the specific implementation mode of the present invention, such as the shape and structure of each component involved, the mutual position and connection relation between each part, the function and working principle of each part, and the monitoring method, will be further described in detail through the description of the embodiment, so as to help those skilled in the art have a more complete, accurate and in-depth understanding of the inventive concept and technical solutions of the present invention.

It should be pointed out that the following detailed descriptions are all illustrative and are intended to provide further descriptions of the present invention. Unless otherwise specified, all technical and scientific terms used in the present invention have the same meanings as those usually understood by a person of ordinary skill in the art to which the present invention belongs.

It should be noted that the terms used herein are merely used for describing specific implementations, and are not intended to limit exemplary implementations of the present invention. As used herein, the singular form is also intended to include the plural form unless the context clearly dictates otherwise. In addition, it should further be understood that, terms "comprise" and/or "include" used in this specification indicate that there are features, steps, operations, devices, components, and/or combinations thereof.

The embodiments and the features of the embodiments in the present invention may be combined with each other without conflict.

Embodiment 1

The Embodiment 1 of the present invention provides a device for monitoring seeding.

In order to solve the problems of insufficient adaptability of existing seeding monitoring sensors and low recognition degree of seed blockage and deficiency in the process of high-speed seeding, to realize the rotating speed measurement of seed dropping motor at the same time and simplify the design structure of the motor. The present embodiment has provided a device for monitoring seeding, being mounted at two sides of a seed tube by adopting a two-channel opposite-emission photoelectric induction mode, wherein one channel is responsible for collecting the time when seeds block light sources, counting the seeding quantity, and realizing identification of seed blockage and seed deficiency according to the length of the blocking time; and the other channel is responsible for collecting the time when the seed belt blocks the light sources, calculating the running speed of the seed belt, and further monitoring the rotating speed of the motor.

The device for monitoring seeding provided in the present embodiment, as shown in FIGS. 1-5, comprising a monitoring sensor 6, wherein the monitoring sensor 6 comprises a sensor emitting module housing 1, infrared light emitting diodes 2, a first sensor-channel emitting end 3, a second sensor-channel emitting end 4, a screw fixing hole 5, a sensor receiving module housing 8, a patch-type photosensitive element 9, a second sensor-channel receiving end 10 and a first sensor-channel receiving end 11; wherein, the first sensor-channel emitting end 3 and the first sensor-channel receiving end 11 constitute a first sensor-channel, and the second sensor-channel emitting end 4 and the second sensor-channel receiving end 10 constitute a second sensor-channel.

Figure 5:
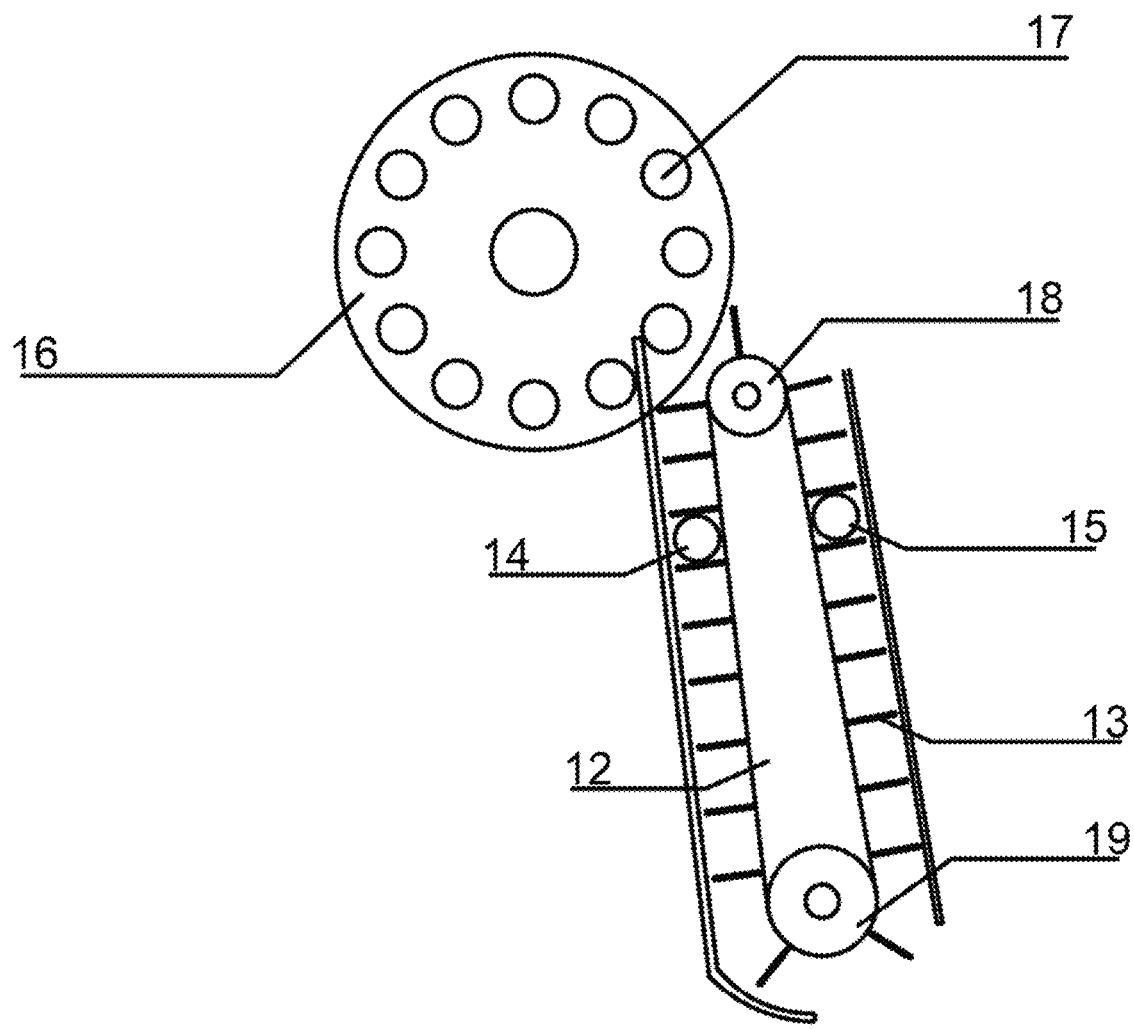
FIG. 5 is a structural diagram of the monitoring sensor and a seed dropping device according to Embodiment 1 of the present invention.

As shown in FIG. 5, the seed dropping device comprises a seed belt 12, belt teeth 13, a seed metering tray 16, seed metering tray openings 17, an upper pulley 18, and a lower pulley 19; wherein, the seeds are carried by the seed metering tray openings 17 on the seed metering tray 16 through an air suction, and when the seeds reach above the seed belt 12, the pressure of the air suction is cut off, and the seeds fall from the seed metering tray openings 17 to the seed belt 12; the seed belt 12 is driven by the upper pulley 18, that is, the rotation of the upper pulley 18 drives the rotation of the seed belt 12, and further drives the rotation of the lower pulley 19.

As shown in FIG. 1, one infrared light emitting diode 2 is respectively mounted inside the first sensor-channel emitting end 3 and the second sensor-channel emitting end 4; and, a plurality of patch-type photosensitive elements 9 are provided inside the first sensor-channel receiving end 11 and the second sensor-channel receiving end 10.

The monitoring sensor 6 provided in the present embodiment is mounted on two sides of the seed belt 12 of the seed dropping device. Specifically, the sensor emitting module housing 1 is provided on one side of the seed belt 12 and is fixed on the seed dropping device by screws through screw fixing hole 5; a first sensor-channel mounting groove 14 and a second sensor-channel mounting groove 15 are provided on the seed dropping device, and the first sensor-channel mounting groove 14 and the second sensor-channel mounting groove 15 are symmetrical with respect to a connecting line between a center point of the upper pulley 18 and a center point of the lower pulley 19; the first sensor-channel emitting end 3 is mounted at the first sensor-channel mounting groove 14, and the second sensor-channel emitting end 4 is mounted at the second sensor-channel mounting groove 15. The sensor receiving module housing 8 is provided on the other side of the seed belt 12 and is fixed on the seed dropping device by screws through the screw fixing hole 5, a first sensor receiving end mounting groove and a second sensor receiving end mounting groove (not shown in the figure) are provided on the seed dropping device, and the first sensor-channel mounting groove 14 and the first sensor receiving end mounting groove are symmetrical with respect to a plane of the seed belt 12, the second sensor-channel mounting groove 15 and the second sensor receiving end mounting groove are symmetrical with respect to the plane of the seed belt 12; and, the first sensor-channel receiving end 11 is mounted at the first sensor receiving end mounting groove, and the second sensor-channel receiving end 10 is mounted at the second sensor receiving end mounting groove.

As shown in FIG. 1, when the device for monitoring seeding provided in the present embodiment is in a normal mounting position, the first sensor-channel emitting end 3 is opposite to the first sensor-channel receiving end 11, and the second sensor-channel emitting end 4 is opposite to the second sensor-channel receiving end 10.

Figure 4:
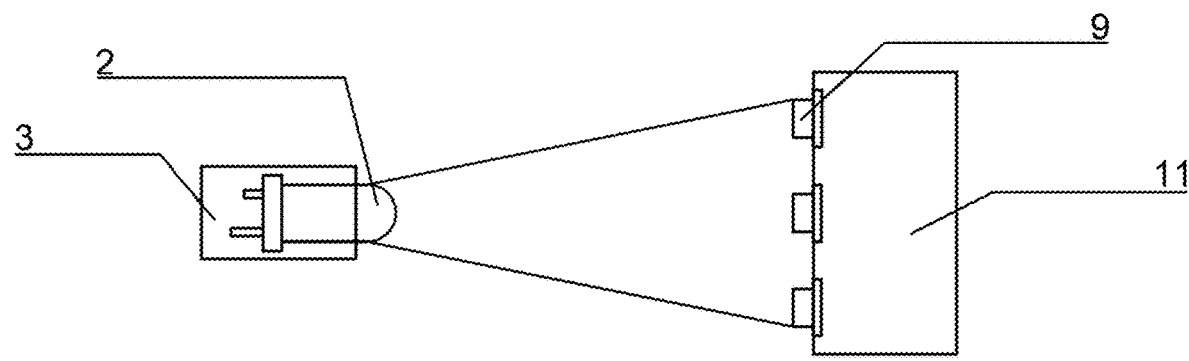
FIG. 4 is an internal layout diagram of the monitoring sensor according to Embodiment 1 of the present invention.

As shown in FIG. 4, the infrared light emitting diode 2 (the infrared light emitting diode D9) is mounted inside the first sensor-channel emitting end 3, and the plurality of patch-type photosensitive elements 9 are mounted inside the first sensor-channel receiving end 11. By adjusting the emitting angle of the infrared light emitting diode 2 and the distance between the emitting end and the receiving end, the three patch-type photosensitive elements 9 (photosensitive element T1, photosensitive element T2, photosensitive element T3) can completely cover the illumination range of the light source, ensuring no monitoring blind area. The internal layout of the second sensor-channel corresponds to the internal layout of the first sensor-channel.

Figure 6:
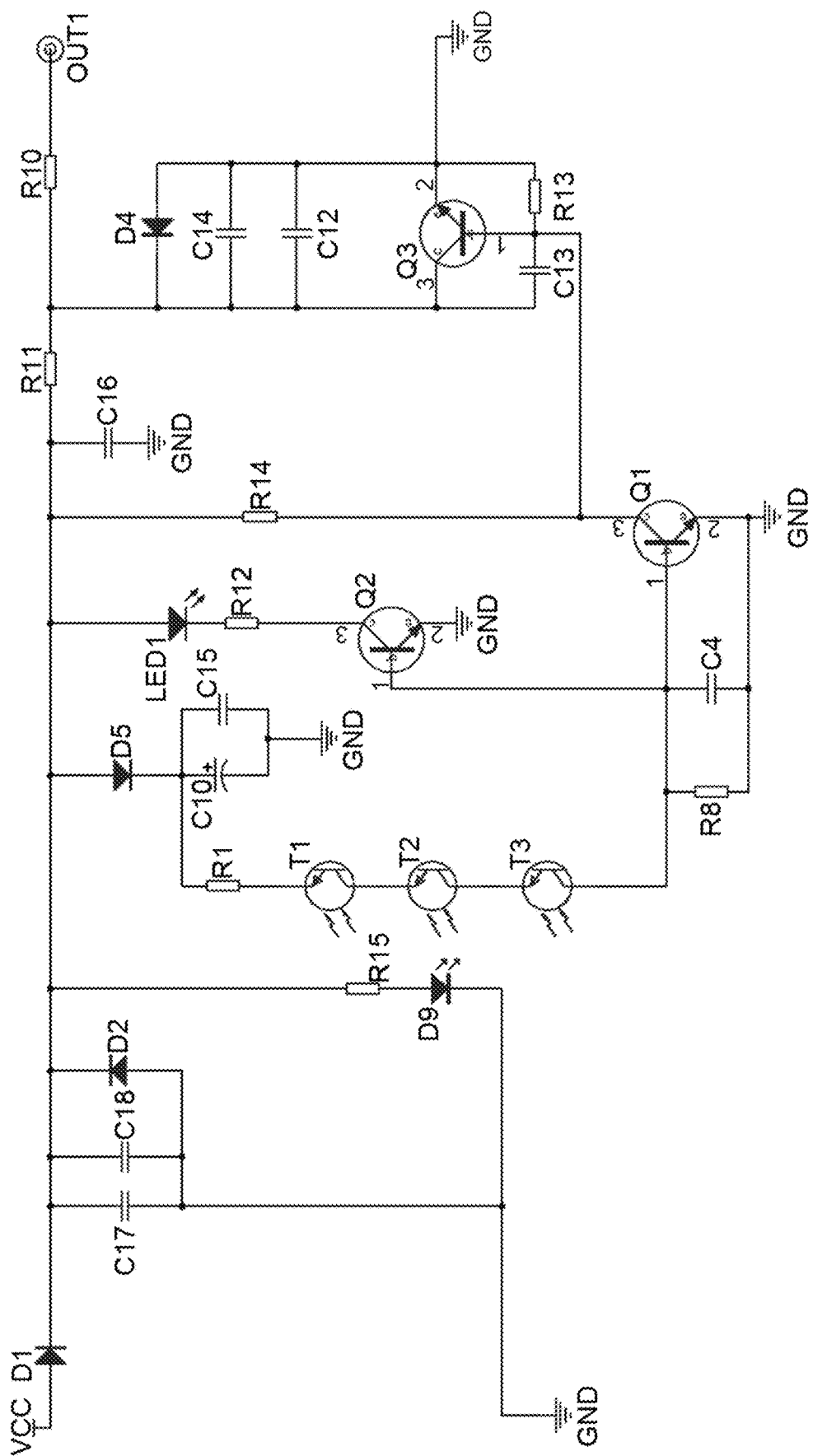
FIG. 6 is an internal circuit diagram of a single channel of a monitoring sensor according to Embodiment 1 of the present invention.

As shown in FIG. 6, the first sensor-channel emitting end 3 and the first sensor-channel receiving end 11 (or the second sensor-channel emitting end 4 and the second sensor-channel receiving end 10), comprising the infrared light emitting diode D9, the photosensitive element T1, the photosensitive element T2, the photosensitive element T3, a resistor R1, a resistor R8, a resistor R10, a resistor R11, a resistor R12, a resistor R13, a resistor R14, a resistor R15, a capacitor C4, a capacitor C12, a capacitor C13, a capacitor C14, a capacitor C15, a capacitor C16, a capacitor C17, a capacitor C18, an electrolytic capacitor C10, a transistor Q1, a transistor Q2, a transistor Q3, a diode D1, a diode D2, a diode D4, a diode D5 and a diode LED1; wherein, the model of the infrared light emitting diode D9 is GL538, a cathode of the infrared light emitting diode D9 is grounded, an anode of the infrared light emitting diode D9 is connected with a second end of the resistor R15, a first end of the resistor R15 is connected with a cathode of the diode D2, first ends of the capacitor C17 and the capacitor C18, and a cathode of the diode D1, an anode of the diode D2, second ends of the capacitor C17 and the capacitor C18 are grounded, and an anode of the diode D1 is connected with the voltage source; a model of the photosensitive element T1, the photosensitive element T2, and the photosensitive element T3 is PT15-21B/TR8 and the three photosensitive elements are sequentially connected, a model of the transistor Q1, the transistor Q2 and the transistor Q3 is MMBT3904, an emitter electrode of the photosensitive element T1 is connected with a first end of the resistor R1, a second end of the resistor R1 is connected with an cathode of the diode D5, and first ends of the electrolytic capacitor C10 and the capacitor C15, second ends of the electrolytic capacitor C10 and the capacitor C15 are grounded, and an anode of the diode D5 is connected with a second end of the resistor R15; a collector electrode of the photosensitive element T1 is connected with an emitter electrode of the photosensitive element T2, a collector electrode of the photosensitive element T2 is connected with an emitter electrode of the photosensitive element T3, a collector electrode of the photosensitive element T3 is connected with first ends of the resistor R8 and the capacitor C4, and base electrodes of the transistor Q1 and the transistor Q2, and second ends of the resistor R8 and the capacitor C4 and emitter electrodes of the transistor Q1 and the transistor Q2 are grounded; a collector electrode of the transistor Q2 is connected with a first end of the resistor R12, a second end of the resistor R12 is connected with a cathode of the diode LED1, an anode of the diode LED1 is connected with an anode of the diode D5, a first end of the resistor R14, a first end of the capacitor C16, and a first end of the resistor R11, a second end of the capacitor C16 is grounded, a second end of the resistor R14 is connected with a collector electrode of the transistor Q1, a first end of the capacitor C13, a first end of the resistor R13 and a base electrode of the transistor Q3; a second end of the resistor R11 is connected with a first end of the resistor R10, a cathode of the diode D4, first ends of the capacitor C12 and the capacitor C14, a collector electrode of the transistor Q3 and a second end of the capacitor C13; an anode of the diode D4, second ends of the capacitor C12 and the capacitor C14, an emitter electrode of the transistor Q3 and a second end of the resistor R13 are grounded, and a second end of the resistor R10 is an output end OUT1. The monitoring sensor two-channel internal circuits are designed for this structure.

When the two-channel light beam of the monitoring sensor 6 is not blocked by the belt teeth of the seed belt or seeds, the photosensitive elements T1, T2 and T3 receive the light beam emitted by the infrared light emitting diode D9, and the output end OUT1 outputs a high-level signal; when the two-channel light beam of the monitoring sensor is blocked by the belt teeth of the seed belt or seeds, the light beam emitted by the infrared light emitting diode D9 is blocked, the photosensitive elements T1, T2 and T3 do not receive the light beam, and the output end OUT1 outputs a low-level signal.

Figure 8:
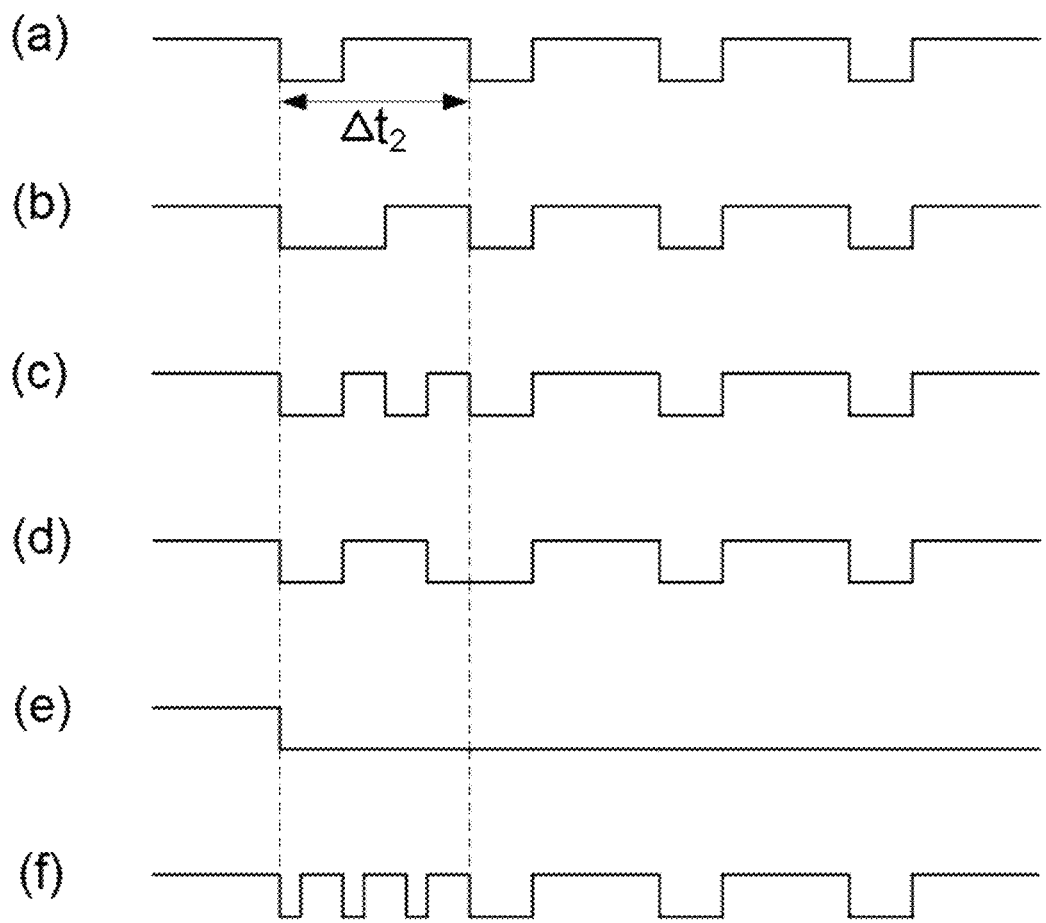
FIG. 8 is a waveform diagram of Embodiment 1 of the present invention.

As shown in FIG. 8, (a) is a waveform diagram of the second sensor-channel when the monitoring sensor works normally. When the light beam is not blocked, the waveform output is a high level, and when the light beam is blocked, the waveform output is a low level. The interval time between two adjacent falling edges of the waveform of the second sensor-channel, i.e., the cycle time, is $\Delta t_2$. (b), (c) and (d) are waveform diagrams under different conditions when normal seeds pass through the first sensor-channel when the monitoring sensor works normally, wherein (b) is a waveform diagram when seeds pass through close to lower belt teeth; (c) is a waveform diagram when seeds pass through at the middle position of two belt teeth; and (d) is a waveform diagram when seeds pass through close to upper belt teeth. (e) is a waveform diagram of the blocking phenomenon in the first sensor-channel when the monitoring sensor works normally, the waveform continues to be in a low level state and the duration time exceeds the cycle time $\Delta t_2$. (f) is a waveform diagram of the reseeding phenomenon in the first sensor-channel when the monitoring sensor works normally, and more than two falling edges appear in the cycle time $\Delta t_2$.

Figure 7:
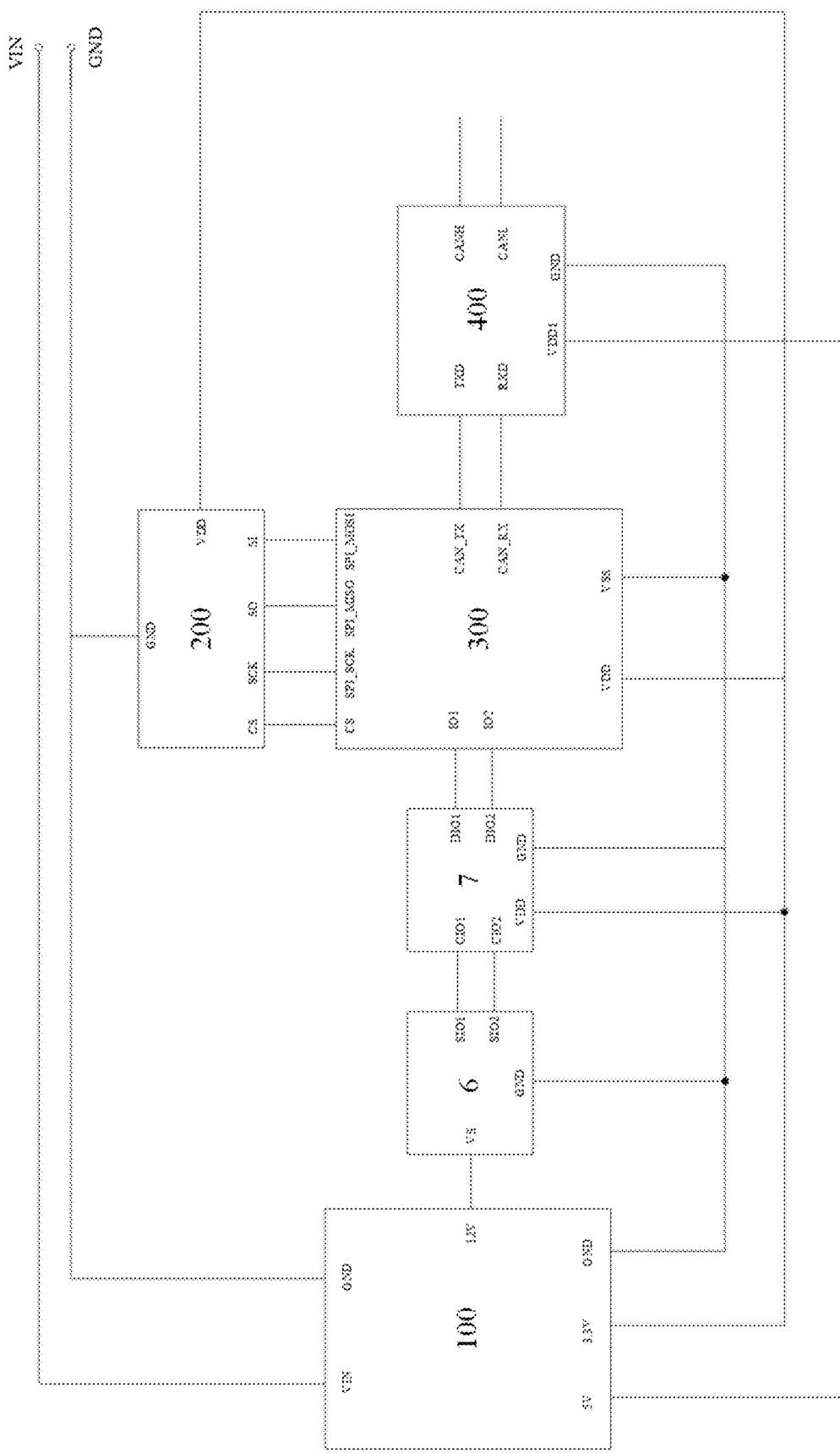
FIG. 7 is a system structure graphic of a device for monitoring seeding according to Embodiment 1 of the present invention.

As shown in FIG. 7, the device for monitoring seeding provided in the present embodiment, comprising a monitoring sensor 6, a sensor signal acquisition unit 7, a power supply module 100, a data storage unit 200, an algorithm control module 300, and a CAN communication module 400. The VIN and GND pins of the power supply module 100 are connected to the positive and negative ends of the external power supply respectively, and the output power pins of the power supply module 100 include 3.3V, 5V and 12V, wherein the model of the power supply chip providing 5V and 12V is TPS54560DDA, and the model of the power supply chip providing 3.3V is TLV7023DBVR. The 3.3V pin is connected to VDD pin of the sensor signal acquisition unit 7, VDD pin of the data storage unit 200 and VDD pin of the algorithm control module 300 respectively, the 5V pin is connected to VDD1 pin of the CAN communication module 400, the 12V pin is connected to VS pin of the monitoring sensor 6, and GND pins of each the module are commonly connected to system common GND. The SIO1 and SIO2 pins of the monitoring sensor 6 are respectively connected with the CIO1 and CIO2 pins of the sensor signal acquisition unit 7, to output two paths of IO signals, wherein one path is seed counting, and the other path is seed belt speed measurement. The sensor signal acquisition unit 7 adopts a first-order low-pass filter circuit, and is mainly responsible for acquiring the two paths of the IO signals and transmitting the two paths of the IO signals to the algorithm control module 300. The DIO1 and DIO2 pins of the sensor signal acquisition unit 7 are respectively connected with the IO1 and IO2 pins of the algorithm control module 300, to transmit the acquired two paths of the IO signals to the algorithm control module 300. The algorithm control module 300 uses a chip STM32F407 to process data and send control instructions, and realizes the seed counting and the seed belt speed monitoring through the monitoring algorithms, and is connected with the data storage module through SPI bus and the CAN communication module through CAN bus. The model of the data storage unit 200 is W25Q128, and the CS, SCK, SO, and SI pins are respectively connected with the CS, SPI_SCK, SPI_MISO, and SPI_MOSI pins of the algorithm control module 300 through four SPI buses, and are mainly responsible for storing seed counting and speed measurement data, and ensuring that data is not lost when power is lost. The model of the CAN communication module 400 is TJA1050, and the TXD and RXD pins of the CAN communication module 400 are respectively connected with the CAN_TX and CAN_RX pins of the algorithm control module 300 through the CAN bus, and are mainly responsible for receiving and outputting monitoring data.

The monitoring sensor of the present embodiment is mounted on both sides of the seed belt, and adopts a two-channel opposite-emission photoelectric induction mode to collect the time when the light source is blocked through infrared light emitting diodes and photosensitive elements at the emitting end and the receiving end. One channel is responsible for collecting time for seeds and seed belt to block light sources, and the other channel is responsible for collecting time for seed belt to block light sources. Two paths of data are collected by the signal acquisition unit and sent to the algorithm control module to count seeding, reseeding and seed missing, identify seed state and monitor the speed, so as to realize counting of normal seeding, reseeding and missing seeds, identifying of seed blockage and seed deficiency, and monitoring of speed of seed belt. Meanwhile, the monitored data are sent to the data storage module for storage through SPI bus, so as to ensure data safety and avoid loss phenomenon. Seed counting data and speed measurement results obtained by algorithm control module are sent to CAN communication module through CAN bus, and then output by CAN communication module. The output information of the CAN communication module is divided into seeding data frame, alarm data frame and speed data frame. For the convenience of motor speed control, the speed data frame is transmitted at high frequency and the interval of the transmission time is 5 ms; the seeding data frame and the alarm data frame are transmitted by trigger mode, and the data transmission is performed when the seeding count is changed or the alarm of seed deficiency and blockage is triggered, thereby realizing the seed counting and speed measurement monitoring process.

According to the device for monitoring seeding provided by the present embodiment, the monitoring sensor adopts a two-channel opposite-emission photoelectric induction mode, so that the counting of seeding, missed seeding and reseeding and the monitoring of seed blockage and seed deficiency in the high-speed operation process of the seeder are realized; meanwhile, the monitoring of the operation speed of the seed belt is realized, so that the real-time monitoring of the rotation speed of the seed dropping motor is realized, the motor rotation speed feedback device is omitted, and the motor design structure is simplified.

According to the device for monitoring seeding provided by the present embodiment, the monitoring of seed blockage, seed deficiency and normal seeding and the monitoring of the rotation speed of the motor in the high-speed seeding process are realized through the high-speed seeding monitoring algorithm, and the seeding quality is further improved.

According to the device for monitoring seeding provided by the present embodiment, the high-speed seeding monitoring system adopts CAN bus to output seeding monitoring data and rotating speed data, has strong stability, facilitates the expansion of rows when the seeder is in multi-row seeding, saves hardware cost, and relieves the data processing pressure of the main controller.

Embodiment 2

The Embodiment 2 of the present invention provides a method for monitoring seeding as in Embodiment 1, comprising the following steps:

Step 1, executing a horizontally process to the seed belt to ensure that the two-channel light sources are blocked simultaneously when the belt teeth on the seed belt pass through the sensors; wherein, when the seed belt passing through the monitoring sensor, the two-channel light sources are blocked at the same time, the receiving end cannot receive the light sources, a falling edge signal is generated, the high level is changed into the low level, a timer in the STM32 Microcontroller Unit (MCU) captures the falling edge signal; when the seed belt passed the monitoring sensor, the receiving end continues to receive the light sources, the falling edge signal is changed into the rising edge signal, the low level is changed into the high level, and the duration time of the two-channel low level signal is recorded at the same time. According to the running speed of the seeder and the set planting plant spacing, the speed required by the motor can be obtained, and there should be one seed in the interval of seed belt every x cycles at the fixed speed.

Figure 9:
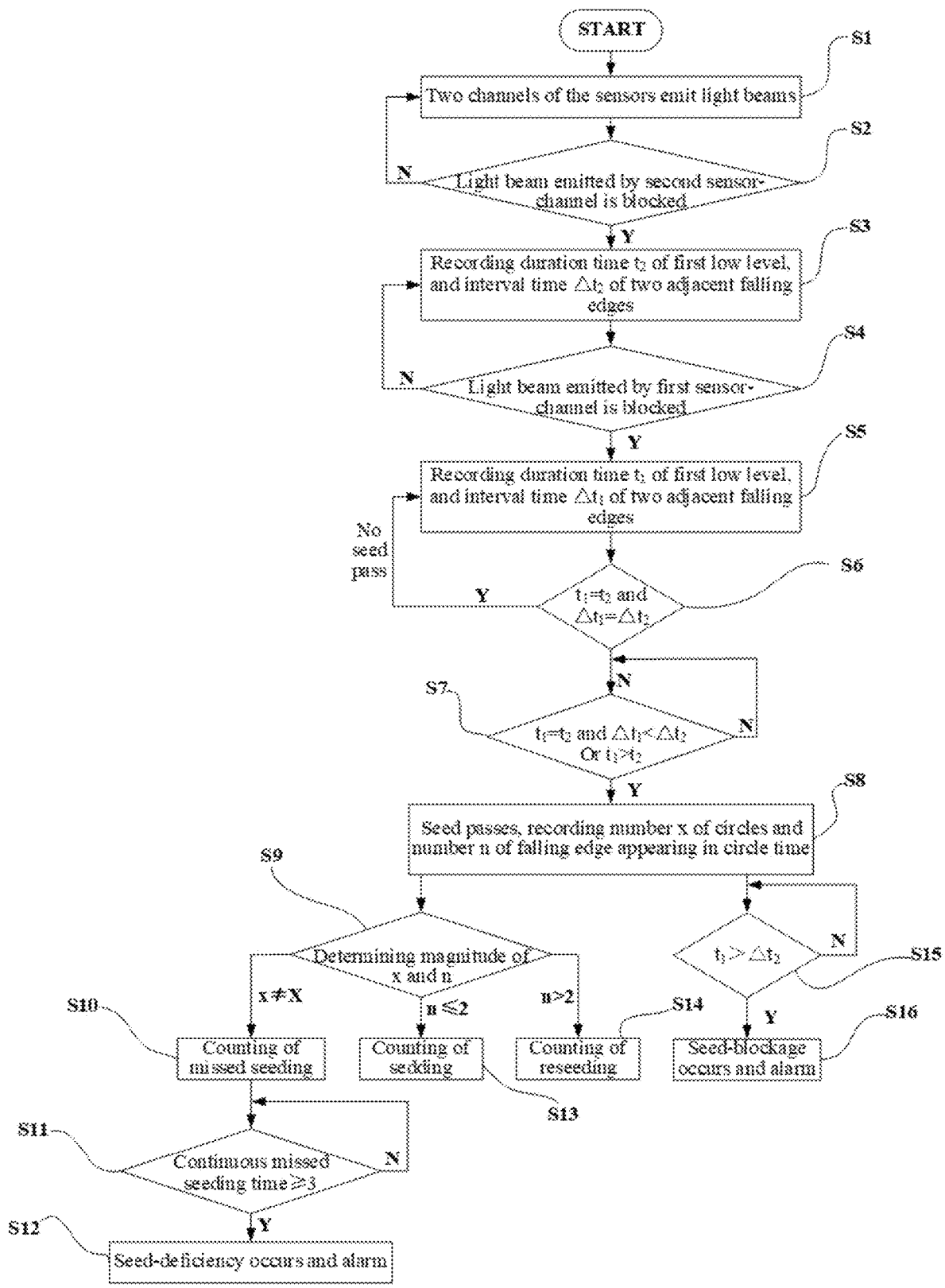
FIG. 9 is a flowchart of an algorithm for counting of seeding, reseeding and missing seeds, and monitoring of seed deficiency and seed blockage according to Embodiment 2 of the present invention.

Step 2, executing the counting of seeding, reseeding and missed seeding, monitoring of seed blockage and seed deficiency, as shown in FIG. 9, including:

S1, preparing for monitoring, at a fixed rotational speed, light beams emitted from the first sensor-channel emitting end and the second sensor-channel emitting end, and received by the first sensor-channel receiving end and the second sensor-channel receiving end;

S2, determining whether the emitted light beam of the second sensor-channel is blocked: when the light beam is blocked, executing step S3; when the light beam is not blocked, executing step S1;

S3, recording the duration time $t_2$ of the first low level of the second sensor-channel and the interval time between two adjacent falling edges, i.e., the circle time $\Delta t_2$;

S4, determining whether the emitted light beam of the first sensor-channel is blocked: when the light beam is blocked, executing step S5; when the light beam is not blocked, executing step S3;

S5, recording the duration time $t_1$ of the first low level of the first sensor-channel and the interval time between two adjacent falling edges $\Delta t_1$;

S6, determining whether $t_1$, $t_2$, $\Delta t_1$, and $\Delta t_2$ satisfy the relation of $t_1=t_2$ and $\Delta t_1=\Delta t_2$: when $t_1=t_2$ and $\Delta t_1=\Delta t_2$ are satisfied, it represents that no seed passes through the first sensor-channel, and the two-channel light sources are blocked by the seed belt, and executing step S5; when $t_1=t_2$ and $\Delta t_1=\Delta t_2$ are not satisfied, executing step S7;

S7, determining whether $t_1$, $t_2$, $\Delta t_1$, and $\Delta t_2$ satisfy the relation of $t_1=t_2$ and $\Delta t_1<\Delta t_2$ or the relation of $t_1>t_2$: if satisfy the relation, it represents that the seed passes through the first sensor-channel, and the light source of the first sensor-channel is blocked by the seed and seed belt, executing step S8; if not satisfy the relation, executing step S7 continuously to determining;

S8, recording the number x of the cycles when the seed passes through and the number n (n>0) of falling edges appearing in the cycle time $\Delta t_2$;

S9, determining the magnitude of x and n values: when x≠X, executing step S10, wherein X is a theoretical value of the number of cycles when seeds pass through; when n≤2 (a set number), it represents the for normal seeding, executing step S13; when n>2, it represents the reseeding, executing step S14;

S10, counting of the missed seeding, the number of the counting of the missed seeding is increased by 1;

S11, determining whether the number of times of continuous missed seeding is greater than or equal to a threshold value of 3: when the number of times of the continuous missed seeding is greater than or equal to 3, executing step S12; and when the number of times of continuous missed seeding is less than 3, continuing to executing step S11 for determining;

S12, making an alarm when the seed deficiency occurs, to remind timely supplement of seeds;

S13, counting of seeding, the number of the counting of the normal seed is increased by 1;

S14, counting of reseeding, the number of the counting of the reseeding is increased by 1;

S15, determining whether $t_1$ and $\Delta t_2$ satisfy the relation of $t_1 > \Delta t_2$: when $t_1 > \Delta t_2$ is satisfied, executing step S16, and when $t_1 > \Delta t_2$ is not satisfied, continue to execute step S15 for determining;

S16, making an alarm if there is the seed blockage occurred, to remind timely shut down of the motor and perform of handling.

Figure 10:
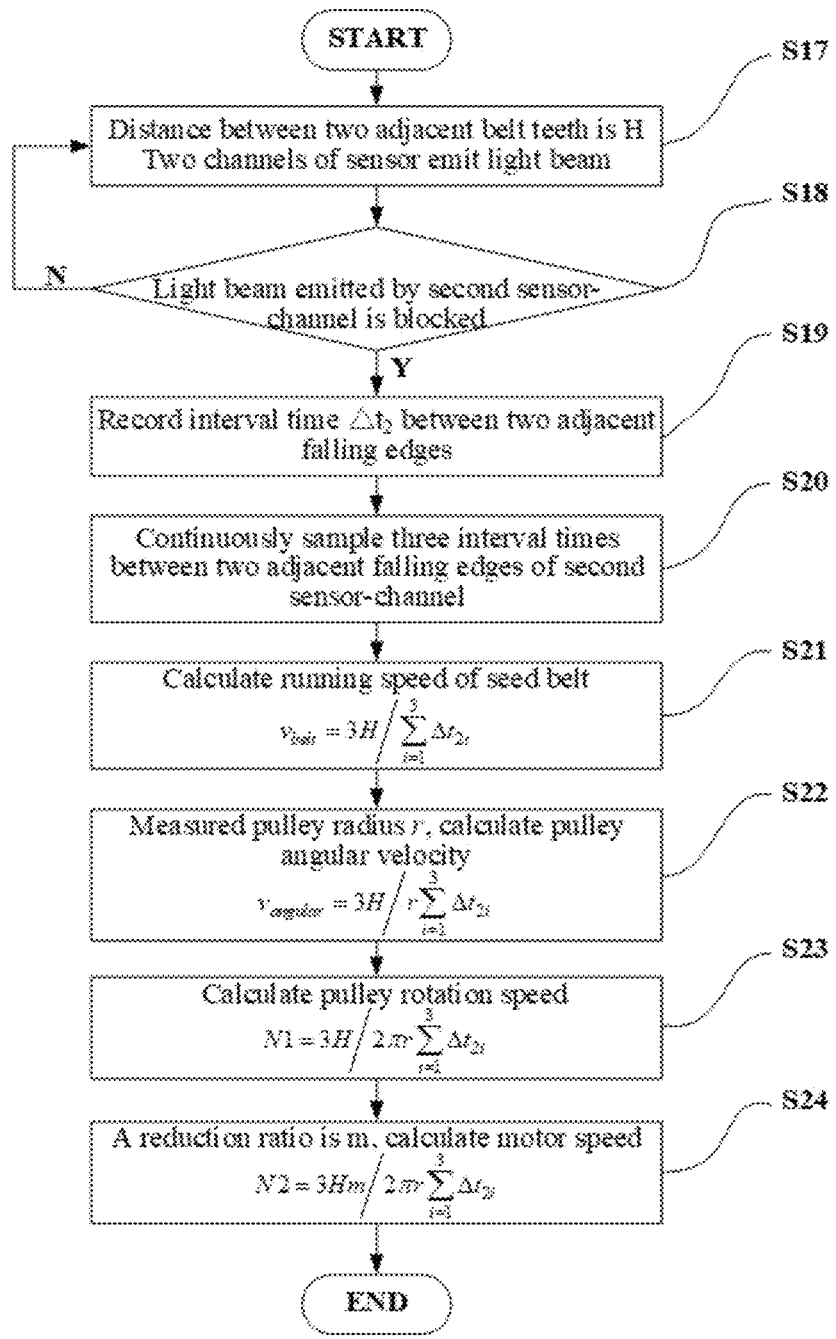
FIG. 10 is a flow chart of a speed measurement algorithm according to Embodiment 2 of the present invention.

Step 3: the speed measurement algorithm flow, as shown in FIG. 10, including:

S17, measuring a distance between two adjacent belt teeth is H, and monitoring the two-channel emitting light beams of the sensors;

S18, determining whether the emitted light beam of the second sensor-channel is blocked: when the light beam is blocked, executing step S19; and when the light beam is not blocked, executing step S17;

S19, recording the interval time $\Delta t_2$ between two adjacent falling edges;

S20: continuously sampling three times the interval time between two adjacent falling edges of the second sensor-channel, as $\Delta t_{2i}$;

S21, calculating a running speed of the seed belt $$v_{belt} = 3H / \sum_{i=1}^{3} \Delta t_{2i};$$

S22, measuring the pulley radius is r, and calculating the angular velocity of the pulley $$v_{angular} = 3H / r \sum_{i=1}^{3} \Delta t_{2i};$$

S23, calculating pulley rotation speed $$N1 = 3H / 2\pi r \sum_{i=1}^{3} \Delta t_{2i};$$

and

S24, calculating, according to a reduction ratio is m, the motor speed $$N2 = 3Hm / 2\pi r \sum_{i=1}^{3} \Delta t_{2i}.$$

The foregoing descriptions are merely preferred embodiments of the present invention but are not intended to limit the present invention. A person skilled in art may make various alterations and variations to the present invention. Any modification, equivalent replacement, or improvement made within the spirit and principle of the present invention shall fall within the protection scope of the present invention.

The invention claimed is:

1. A method for monitoring seeding, comprising a monitoring sensor and an algorithm control module which are mutually connected; wherein, the monitoring sensor comprises a first sensor-channel emitting end, a first sensor-channel receiving end, a second sensor-channel emitting end and a second sensor-channel receiving end, and are arranged, in a two-channel opposite-emission photoelectric induction mode, on two sides of a seed belt, respectively; wherein, the first sensor-channel emitting end and the first sensor-channel receiving end form a first sensor-channel, and the second sensor-channel emitting end and the second sensor-channel receiving end form a second sensor-channel; wherein, the first sensor-channel emitting end and the first sensor-channel receiving end are symmetrical with respect to a plane in which the seed belt is located, and the second sensor-channel emitting end and the second sensor-channel receiving end are symmetrical with respect to a plane in which the seed belt is located;

and, the algorithm control module is configured to perform counting of seeding, reseeding and missed seeding, monitoring of seed deficiency and seed blockage according to a duration time of a first low level and an interval time of two adjacent falling edges of signals of the two sensor-channels; further, to perform monitoring of a rotating speed of a motor according to an interval time of two adjacent falling edges of signals of the second sensor-channel;

wherein, the performing the counting of the seeding, the reseeding and the missed seeding, and the monitoring of the seed deficiency and the seed blockage, comprising:

S1, preparing for monitoring, at a fixed rotational speed, light beams emitted from the first sensor-channel emitting end and the second sensor-channel emitting end, and received by the first sensor-channel receiving end and the second sensor-channel receiving end;

S2, determining whether the emitted light beam of the second sensor-channel is blocked: when the emitted light beam of the second sensor-channel is blocked, executing step S3; when the emitted light beam of the second sensor-channel is not blocked, executing step S1;

S3, recording the duration time $t_2$ of the first low level of the second sensor-channel and the interval time $\Delta t_2$ (the circle time) between two adjacent falling edges;

S4, determining whether the emitted light beam of the first sensor-channel is blocked: when the emitted light beam of the first sensor-channel is blocked, executing step S5; when the emitted light beam of the first sensor-channel is not blocked, executing step S3;

S5, recording the duration time $t_1$ of the first low level of the first sensor-channel and the interval time $\Delta t_1$ between two adjacent falling edges;

S6, determining whether $t_1$, $t_2$, $\Delta t_1$, and $\Delta t_2$ satisfy relations of $t_1 = t_2$ and $\Delta t_1 = \Delta t_2$: when $t_1 = t_2$ and $\Delta t_1 = \Delta t_2$ are satisfied, representing that no seed passes through the first sensor-channel, the two-channel light sources are blocked by the seed belt, and executing step S5; when $t_1 = t_2$ and $\Delta t_1 = \Delta t_2$ are not satisfied, executing step S7;

S7, determining whether $t_1$, $t_2$, $\Delta t_1$, and $\Delta t_2$ satisfy relations of $t_1 = t_2$ and $\Delta t_1 < \Delta t_2$ or a relation of $t_1 > t_2$: if satisfy the relation, representing that the seed passes through the first sensor-channel, the light source of the first sensor-channel is blocked by the seed and seed belt, and executing step S8; if not satisfy the relation, executing step S7 continuously to determining;

S8, recording the number x of the cycles when the seed passes through and the number n (n>0) of falling edges appearing in the cycle time $\Delta t_2$;

S9, determining the magnitude of x and n values: when x #X, executing step S10, wherein X is a theoretical value of the number of cycles when seeds pass through; when n≤2 (a set number), representing that there is a normal seeding, executing step S13; when n>2, representing that there is the reseeding, executing step S14;

S10, counting of the missed seeding, the number of the counting of the missed seeding is increased by 1;

S11, determining whether the number of times of continuous missed seeding is greater than or equal to a threshold value of 3: when the number of times of the continuous missed seeding is greater than or equal to 3, executing step S12; and when the number of times of continuous missed seeding is less than 3, continuing to executing step S11 for determining;

S12, making an alarm when the seed deficiency occurs, to remind timely supplement of seeds;

S13, counting of seeding, the number of the counting of the normal seed is increased by 1;

S14, counting of reseeding, the number of the counting of the reseeding is increased by 1;

S15, determining whether $t_1$ and $\Delta t_2$ satisfy the relation of $t_1 > \Delta t_2$: when $t_1 > \Delta t_2$ is satisfied, executing step S16, and when $t_1 > \Delta t_2$ is not satisfied, continue to execute step S15 for determining;

S16, making an alarm if there is the seed blockage occurred, to remind timely shut down of the motor and perform of handling;

Step 3: the speed measurement algorithm flow, as shown in FIG. 10, including:

S17, measuring a distance between two adjacent belt teeth is H, and monitoring the two-channel emitting light beams of the sensors;

S18, determining whether the emitted light beam of the second sensor-channel is blocked: when the light beam is blocked, executing step S19; and when the light beam is not blocked, executing step S17;

S19, recording the interval time $\Delta t_2$ between two adjacent falling edges;

S20: continuously sampling three times the interval time between two adjacent falling edges of the second sensor-channel, as $\Delta t_{2i}$;

S21, calculating a running speed of the seed belt $$v_{belt} = 3H / \sum_{i=1}^{3} \Delta t_{2i};$$

S22, measuring the pulley radius is r, and calculating the angular velocity of the pulley $$v_{angular} = 3H / r \sum_{i=1}^{3} \Delta t_{2i};$$

S23, calculating pulley rotation speed $$N1 = 3H / 2\pi r \sum_{i=1}^{3} \Delta t_{2i};$$

and

S24, calculating, according to a reduction ratio is m, the motor speed $$N2 = 3Hm / 2\pi r \sum_{i=1}^{3} \Delta t_{2i}.$$

2. The method for monitoring seeding according to claim 1, wherein an upper pulley and a lower pulley are respectively arranged at two ends of the seed belt;
   wherein, the first sensor-channel emitting end and the second sensor-channel emitting end are symmetrical with respect to a connecting line of a center point of the upper pulley and a center point of the lower pulley.

3. The method for monitoring seeding according to claim 1, wherein an infrared light emitting diode is respectively provided inside the first sensor-channel emitting end and the second sensor-channel emitting end, and a plurality of photosensitive elements are provided inside the first sensor-channel receiving end and the second sensor-channel receiving end.

4. The method for monitoring seeding according to claim 3, wherein by adjusting an emission angle of the infrared light emitting diode, a distance between the first sensor-channel emitting end and the first sensor-channel receiving end, and a distance between the second sensor-channel emitting end and the second sensor-channel receiving end, all the plurality of the photosensitive elements cover an illumination range of light beam emitted by the infrared light emitting diode.

5. The method for monitoring seeding according to claim 1, wherein when belt teeth on the seed belt pass through the monitoring sensor, the light beams of the first sensor-channel and the second sensor-channel are blocked simultaneously.

6. The method for monitoring seeding according to claim 1, wherein: if the duration time of the first low level of the signal of the first sensor-channel is equal to the duration time of the first low level of the signal of the second sensor-channel, and the interval time between the two adjacent falling edges of the signal of the first sensor-channel is less than the interval time between the two adjacent falling edges of the signal of the second sensor-channel, or if the duration time of the first low level of the signal of the first sensor-channel is greater than the duration time of the first low level of the signal of the second sensor-channel, representing that there are seeds passing through, then recording a number of cycles when the seeds passing through, and recording a number of times the falling edges occur in the signal of the first sensor-channel within the interval time between the two adjacent falling edges of the signal of the second sensor-channel; if the number of the times the falling edges occur is within a set number, executing the counting of the seeding; if the number of the times the falling edges occur exceeds the set number, executing the counting of the reseeding; if the number of the cycles when the seeds passing through is not a theoretical value, executing the counting of the missed seeding; if a number of the counting of the missed seeding exceeds a threshold value, representing that the seed deficiency occurs.

7. The method for monitoring seeding according to claim 1, wherein: if the duration time of the first low level of the signal of the first sensor-channel is greater than the interval time between the two adjacent falling edges of the signal of the second sensor-channel, representing that the seed blockage occurs.

* * * * *